J. STARR.
Garden Hand-Plow.
No. 80,842. Patented Aug. 11, 1868.
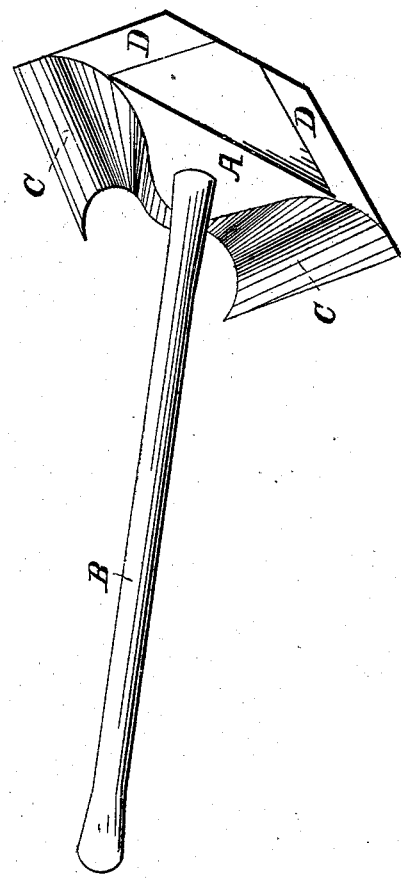
WITNESSES:
Martin Metcalf
Humphrey Sinclair
INVENTOR:
John Starr

United States Patent Office.

JOHN STARR, OF GRAND RAPIDS, MICHIGAN.

Letters Patent No. 80,842, dated August 11, 1868.

IMPROVEMENT IN GARDEN HAND-PLOWS.

The Schedule referred to in these Letters Patent and making part of the same.

TO ALL WHOM IT MAY CONCERN:

Be it known that I, JOHN STARR, of the city of Grand Rapids, in the county of Kent, in the State of Michigan, have invented a certain new and useful Improvement in Garden Hand-Plows; and I do hereby declare that the following is a full, clear, and exact description of the same, reference being had to the accompanying drawings, and to the letters of reference marked thereon.

The nature of my invention consists in making a hand-plow double, and constructing it in such a manner that when drawn toward the operator, the furrow is turned in either direction desired, by reversing the sides of same, or turning the plow over by its handle.

To enable others skilled in the art to make and use my invention, I will proceed to describe its peculiar construction and operation.

Figure 1 is a perspective view of the plow, showing the construction of the same.

A, in the figure, represents the head-block of the plow, which may be made of wood, as here represented, or it may be made of metal.

B represents the handle of the same, by which the plow is operated.

C C represent the shares, which are for the purpose of cutting the weeds and turning the soil; these should be made of steel.

D D represent the land-sides, also of steel.

The shares and land-sides are attached to the head-block by means of screws or bolts.

This implement is intended for use in the garden, mainly, but it may be advantageously applied to the cultivation of any crop grown in drills.

It is most advantageously used in the cultivation of vegetables grown in beds, in the manner following, viz:

The operator, standing in the path at the head of the rows, is enabled to reach down between the latter and draw the plow toward him. By running the land-side of the plow close up to the growing crop, the furrow is thrown from the row on one side of the operator, and toward the centre of the space between the rows. If, now, the plow be turned over, and the land-side run alongside of the next row, the furrow will be turned from that row also, thus very effectually and expeditiously clearing the surface of all weeds, and plowing them under, without the necessity of changing the position of the operator, as with other implements.

The next time the beds are to be cultivated, I prefer to run the share-side of the plow toward the row, turning it over, as before, but this time throwing the land up to the growing crop, and so alternating the process, from time to time, as may be desired.

The great advantage claimed for this plow consists, first, in making it double, having the share and land-sides on the sides corresponding with each other, for the purpose of reversing the plow, by turning the implement so that the ground may be cultivated without change of position of the operator; second, in that it is very cheaply made, and very durable.

It may be used for various purposes, among which may be mentioned that of preparing the seed-bed for the reception of the seed, as follows, viz:

By turning the plow up a trifle on the land-side, and drawing it along, a very even, true furrow is prepared, of a depth corresponding with the angle on which the plow is held. When the seed is placed therein, it is very quickly and evenly covered, by once drawing the plow along with its share-side close to the row or furrow, thus turning the soil over it.

What I claim, and desire to secure by Letters Patent, is—

A double hand-plow, when constructed substantially as and for any or all of the purposes specified.

In witness that I claim the foregoing, I have hereunto set my hand and seal, this 21st day of May, A. D. 1868.

JOHN STARR. [L. S.]

Witnesses:
 MARTIN METCALF,
 THOMPSON SINCLAIR.